United States Patent
Ishii et al.

(10) Patent No.: US 9,746,097 B1
(45) Date of Patent: Aug. 29, 2017

(54) SOLENOID OF ELECTROMAGNETIC VALVE

(71) Applicant: Nidec Tosok Corporation, Zama-shi, Kanagawa (JP)

(72) Inventors: Hiroki Ishii, Zama (JP); Tomohiro Yasuda, Zama (JP); Weiming Chen, Zama (JP); Yoshihiko Ohira, Zama (JP); Takashi Hashimoto, Zama (JP); Masaya Kishi, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 15/428,255

(22) Filed: Feb. 9, 2017

(30) Foreign Application Priority Data

Feb. 10, 2016 (JP) ................................ 2016-023409

(51) Int. Cl.
| | | |
|---|---|---|
| *H01F 5/00* | (2006.01) | |
| *F16K 31/06* | (2006.01) | |
| *H01F 7/20* | (2006.01) | |

(52) U.S. Cl.
CPC ........... *F16K 31/0675* (2013.01); *H01F 7/20* (2013.01)

(58) Field of Classification Search
CPC ......... G01R 33/035; H01F 6/00; F16K 31/02; F16K 31/06; F16K 11/24; F02M 59/96; F15B 13/044
USPC ........................................................ 335/299
See application file for complete search history.

(56) References Cited

U.S. PATENT DOCUMENTS

| | | | | |
|---|---|---|---|---|
| 5,788,213 A | * | 8/1998 | Kanda ................... | H01F 7/1607 251/129.02 |
| 6,029,704 A | * | 2/2000 | Kuroda ............... | F16K 31/0613 137/625.65 |
| 6,036,447 A | * | 3/2000 | Kawaguchi ......... | F04B 27/1804 251/129.02 |

(Continued)

FOREIGN PATENT DOCUMENTS

| | | |
|---|---|---|
| JP | 07-103355 A | 4/1995 |
| JP | 2011-153697 A | 8/2011 |

*Primary Examiner* — Shawki S Ismail
*Assistant Examiner* — Lisa Homza
(74) *Attorney, Agent, or Firm* — Keating & Bennett, LLP

(57) ABSTRACT

The present disclosure relates to a solenoid of an electromagnetic valve where the number of processes can be reduced and breaking of a conductive wire can be suppressed in a simple structure, and the solenoid of the electromagnetic valve according to the present disclosure comprises a conductive wire; a bobbin having a tubular winding portion where the conductive wire is wound around in a coil shape and a flange portion disposed on both end portions of the winding portion; a terminal portion which is disposed on the flange portion and protrudes in a planar shape in a direction perpendicular to the central axis of the bobbin on a radially outer side than the winding portion relative to the central axis, and in which two terminals are provided on a distal end portion side; and two wall portions which are disposed on both sides of the terminal portion in a width direction, stand upright in a central axis direction and face each other, wherein both end portions of the conductive wire are drawn out from the bobbin to the terminal portion, directed toward a radially outer side from a winding portion side of the two wall portions and electrically connected to the terminals.

10 Claims, 8 Drawing Sheets

(56) References Cited

U.S. PATENT DOCUMENTS

| | | | |
|---|---|---|---|
| 6,619,616 B1* | 9/2003 | Sudani | F16K 31/0637 137/596.17 |
| 6,827,328 B2* | 12/2004 | Ha | F01L 1/34 137/625.65 |
| 7,007,925 B2* | 3/2006 | Nordstrom | F01L 1/34 123/90.11 |
| 7,137,411 B2* | 11/2006 | Golovatai-Schmidt | F16K 31/0637 137/625.65 |
| 7,325,564 B2* | 2/2008 | Ryuen | F16K 11/0716 137/375 |
| 7,468,647 B2* | 12/2008 | Ishibashi | F16K 31/0613 251/129.15 |
| 7,472,883 B2* | 1/2009 | Murao | F16K 31/061 251/129.15 |
| 7,487,798 B2* | 2/2009 | Furuta | F16K 31/0613 137/625.65 |
| 7,712,453 B2* | 5/2010 | Nonoyama | F02M 51/005 123/458 |
| 7,886,760 B2* | 2/2011 | Groschel | F16K 31/06 137/315.03 |
| 7,992,839 B2* | 8/2011 | Nordstrom | F16K 31/0613 251/129.15 |
| 8,006,719 B2* | 8/2011 | Nordstrom | F16K 31/0613 137/625.68 |
| 8,186,378 B2* | 5/2012 | Nordstrom | F16K 31/0613 137/550 |
| 8,814,136 B2* | 8/2014 | Mizui | F16K 31/06 251/129.15 |
| 9,305,694 B2* | 4/2016 | Shimizu | H01F 7/128 |
| 2002/0000529 A1* | 1/2002 | Ishigaki | F02M 25/0836 251/129.15 |
| 2005/0184841 A1* | 8/2005 | Ryuen | F16K 31/0631 335/220 |
| 2009/0121817 A1* | 5/2009 | Ishibashi | H01F 7/13 335/255 |
| 2009/0140189 A1* | 6/2009 | Kokubu | F16K 31/0613 251/129.15 |
| 2012/0212309 A1* | 8/2012 | Kondo | F16K 31/0613 335/262 |
| 2015/0279538 A1* | 10/2015 | Toda | F16K 31/0665 475/31 |

* cited by examiner

SOLENOID OF ELECTROMAGNETIC VALVE

CROSS REFERENCE TO RELATED APPLICATIONS

This application claims the benefit of priority to Japanese Patent Application No. 2016-023409 filed on Feb. 10, 2016. The entire contents of this application are hereby incorporated herein by reference.

BACKGROUND OF THE INVENTION

1. Field of the Invention

The present disclosure relates to a solenoid of an electromagnetic valve.

2. Description of the Related Art

An electromagnetic valve is used for hydraulic control of an automatic transmission of a vehicle. This electromagnetic valve opens and closes a valve main body connected to a plunger in a hydraulic circuit by driving the plunger made of a piece of iron by the electromagnetic force generated from a solenoid. The solenoid of this electromagnetic valve includes a cylindrical bobbin and an enameled wire wound around the bobbin to form a coil.

Both end portions of the enameled wire wound around the bobbin extend to terminals for connecting with the outside, which are disposed on an outer side of one end of the bobbin, and are connected and fixed to the terminals. At this time, considering the workability when winding the enameled wire around the bobbin, both of the end portions of the enameled wire were formed to have a cross shape with a minute clearance, and respectively connected to the terminals. Further, in order to prevent a short circuit, some methods were adopted in which the cross portion is fixed by resin-molding or fixed with an adhesive. In the following description, the wiring with both of the end portions of the enameled wire formed in the cross shape is referred to as a cross wiring.

However, when the cross portion is resin-molded, the cross portion may be too narrow to function as a flow path for the resin mold, and the enameled wire of the cross portion may be pulled. When temperature change is repeated in this state, the enameled wire may break and become disconnected.

In order to prevent this disconnection, the cross portion may be protected with a UV-curable adhesive or a silicon rubber layer, which makes, however, the processes become complicated.

Alternatively, it may also be considered not to use the cross wiring. In this case, however, the enameled wire may become wider between a winding start portion and a winding end portion of the enameled wire, thereby causing breaking of the wire.

SUMMARY OF THE INVENTION

An exemplary preferred embodiment according to the present disclosure is a solenoid of an electromagnetic valve, comprising: a conductive wire; a bobbin having a tubular winding portion where the conductive wire is wound around in a coil shape, and a flange portion disposed on both end portions of the winding portion; a terminal portion which is disposed on the flange portion and protrudes in a planar shape in a direction perpendicular to a central axis of the bobbin on a radially outer side than the winding portion relative to the central axis, and in which two terminals are provided on a distal end portion side; and two wall portions which are disposed on both sides of the terminal portion in a width direction, stand upright in a central axis direction and face each other, wherein both end portions of the conductive wire are drawn out from the bobbin to the terminal portion, directed toward a radially outer side from a winding portion side of the two wall portions and electrically connected to the terminals.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Exemplary Preferred Embodiment

Hereinafter, a solenoid of an electromagnetic valve according to the present disclosure will be described with reference to the accompanying drawings. In the specification, the term "axis" refers to a central axis which extends along a longitudinal direction of a bobbin or a winding portion, and the term which may be simply described as "circumferential direction" or "axial direction" indicates the circumferential direction of the central axis or the axial direction of the central axis. Likewise, the term "radial direction" indicates a direction orthogonal to the central axis. One side of the axial direction is referred to as "upper side" and other side of the axial direction is referred to as "lower side." It should be appreciated that this definition of a vertical direction is for the convenience of explanation and that it does not necessarily coincide with the direction of gravity.

Figure 1:
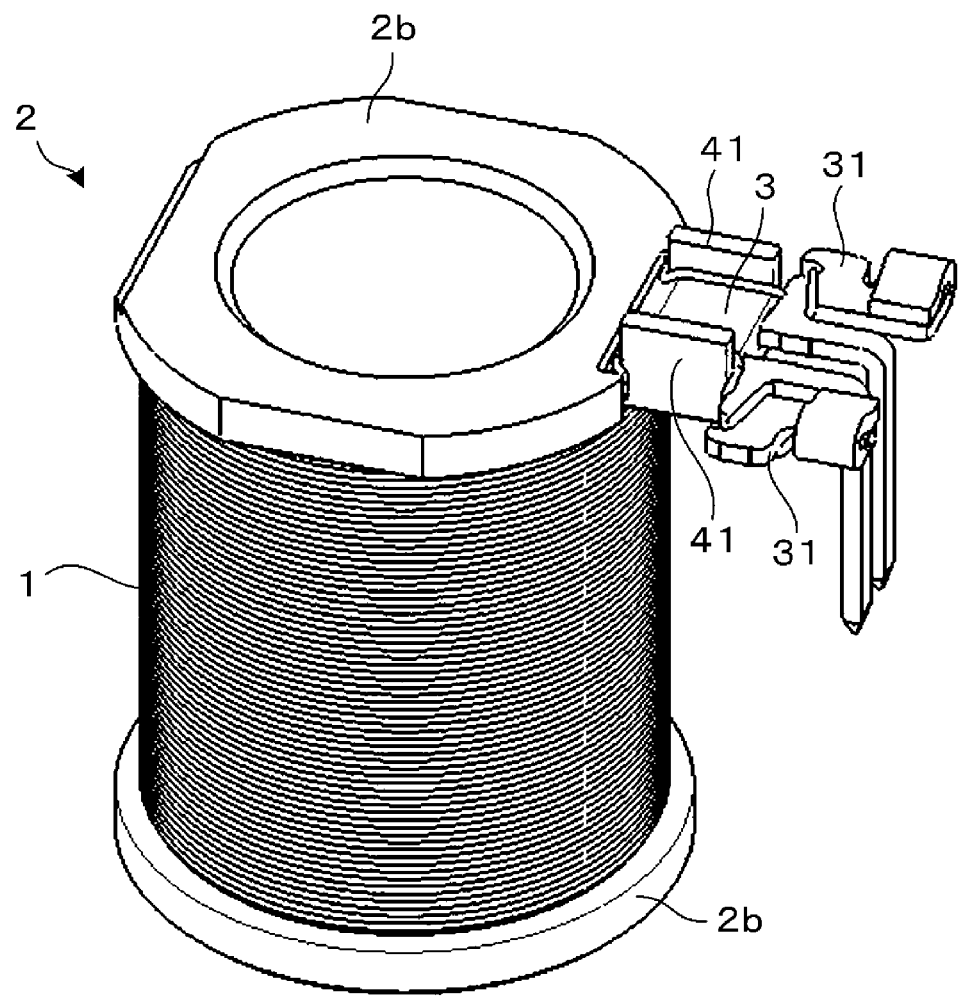
FIG. 1 is a perspective view of a solenoid of an electromagnetic valve according to the first exemplary preferred embodiment of the present invention.
Figure 2:
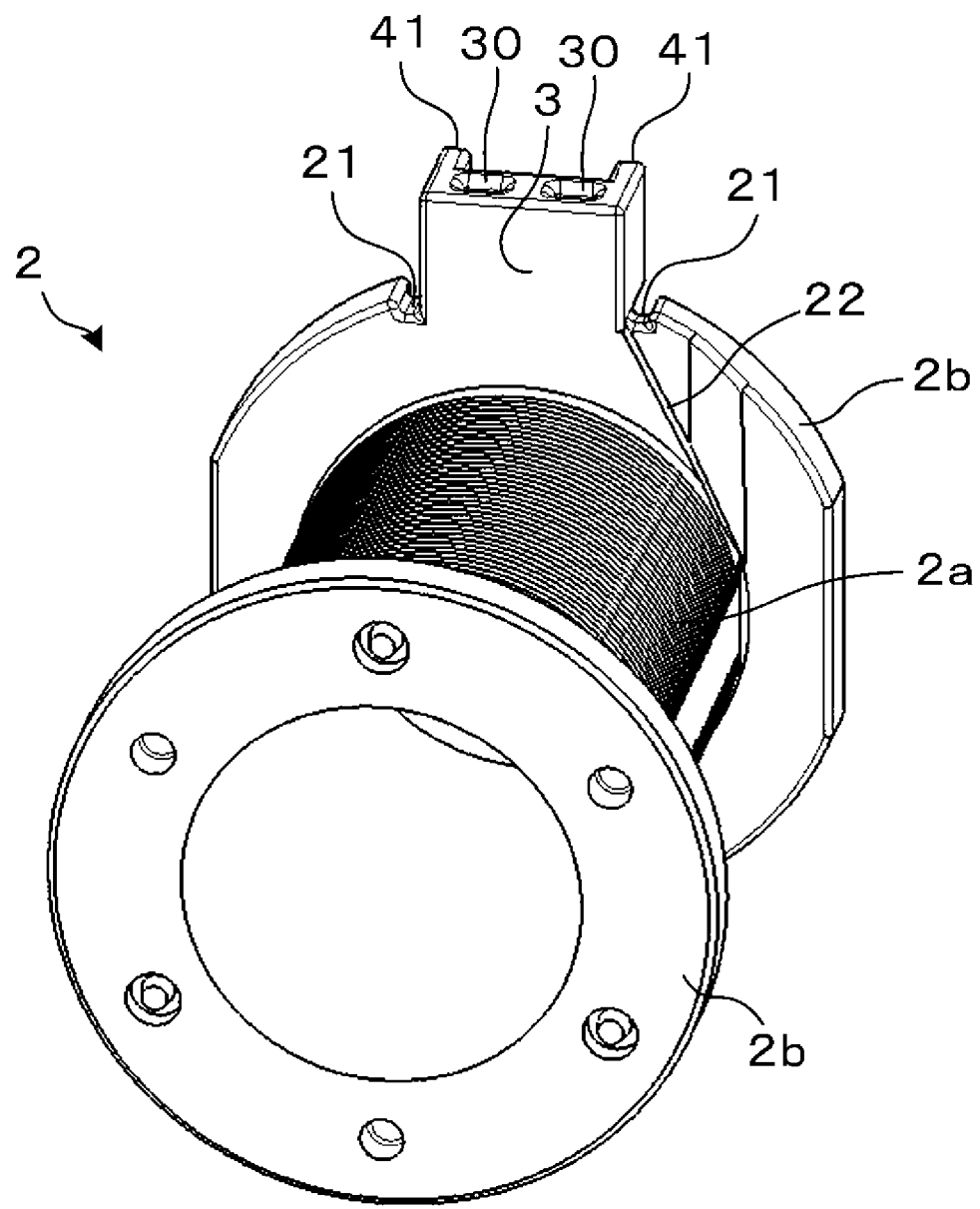
FIG. 2 is a perspective view of a bobbin according to the first exemplary preferred embodiment of the present invention.

As illustrated in FIG. 1, a solenoid of an electromagnetic valve according to this preferred embodiment includes a conductive wire 1 and a bobbin 2. The conductive wire 1 is an electrically conductive wire with insulating coating, such as an enameled wire. As illustrated in FIG. 1 and FIG. 2, the bobbin 2 includes a cylindrical winding portion 2a which the conductive wire 1 is wound around in a coil shape, and a flange portion 2b which is disposed on both end portions of the winding portion 2a. The winding portion 2a is a body portion of the bobbin 2, and a groove for winding the conductive wire 1 is provided on an outer circumferential surface of the winding portion 2a. The flange portion 2b is a flange extending radially outward from the central axis of the winding portion 2a. The surface of the flange portion 2b on the winding portion 2a side is referred to as "inner surface" and the surface on the opposite side to the winding portion 2a is referred to as "outer surface."

The flange portion 2b includes a terminal portion 3 having two terminals 31. Here, the terminal portion 3 is disposed on the flange portion 2b on one end portion of the winding portion 2a, between two flange portions 2b disposed on both of the end portions of the cylindrical winding portion 2a.

The terminal portion 3 protrudes in a planar shape in a direction perpendicular to the central axis of the bobbin 2 on a radially outer side than the winding portion 2a relative to the central axis, and the terminals 31 are provided on a distal end portion side of the terminal portion 3.

More specifically, the terminal portion 3 extends in the planar shape perpendicularly to the axial direction, and the terminals 31 are respectively inserted into two openings 30 separately formed in a width direction on the distal end portion of the terminal portion 3. Here, the width direction of the terminal portion 3 is perpendicular to the radially outwardly extending direction of the terminal portion 3, that is, the direction from a proximal end side to the distal end portion side of the terminal portion 3, and also perpendicular to the axial direction.

As illustrated in FIG. 2, two notch portions 21 are provided on outer edge portions of the flange portion 2b and on opposite outer sides of the terminal portion 3, and both end portions of the conductive wire 1 wound around the winding portion 2a are drawn out from an inner surface side of the flange portion 2b to an outer surface side of the flange portion 2b via the respective notch portions 21.

A groove 22 reaching from each notch portion 21 to the winding portion 2a is provided on the inner surface of the flange portion 2b. A winding start portion of the conductive wire 1 passes through the groove 22.

Figure 3:
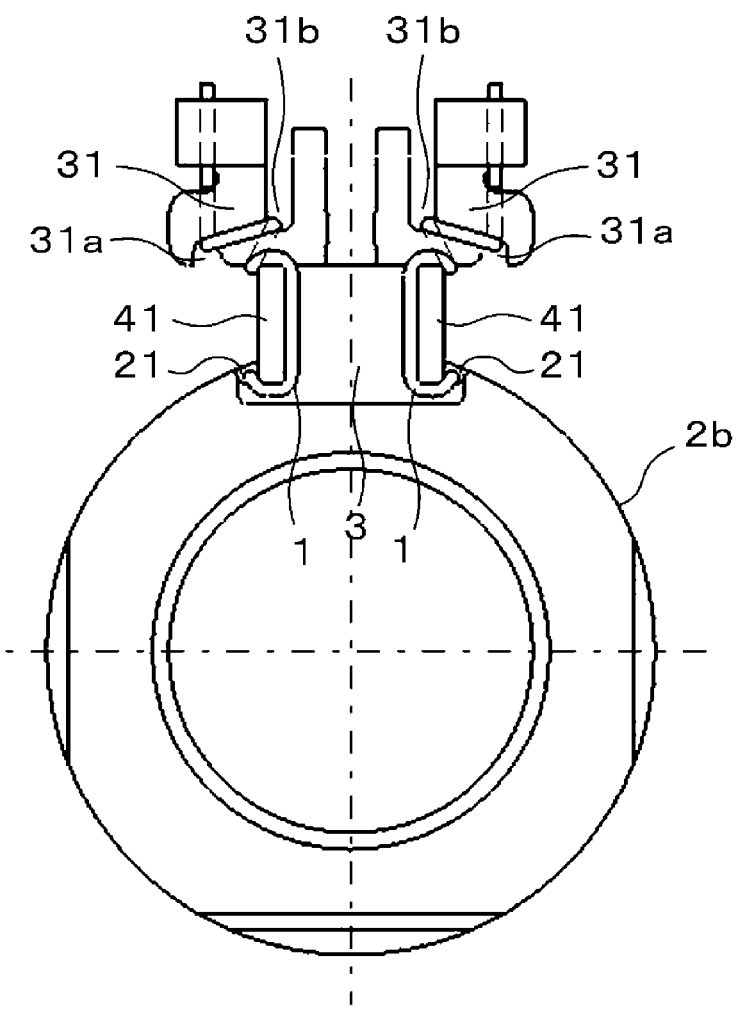
FIG. 3 is a top view of the solenoid of the electromagnetic valve according to the first exemplary preferred embodiment of the present invention.

As illustrated in FIG. 1 and FIG. 3, two wall portions 41 are disposed on an axial end surface of the terminal portion 3, that is, an upper end surface of the terminal portion 3. Two wall portions 41 are disposed on both sides of the terminal portion 3 in the width direction and face with each other while standing upright in the axial direction.

In this preferred embodiment, the wall portions 41 are protrusions that stand upright with respect to the upper end surface of the terminal portion 3 in the axis direction. Further, the wall portions 41 extend from the terminals 31 to the outer edge portions of the flange portion 2b. A gap between the two wall portions 41 is narrower than an outer diameter of the winding portion 2a.

Both of the end portions of the conductive wire 1 are drawn out from the bobbin 2 to the terminal portion 3 via the notch portions 21 provided on opposite outer sides of two wall portions 41, directed to the radially outer side from the winding portion 2a side of two wall portions 41, and electrically connected to the terminals 31. Here, as illustrated in FIG. 3, both of the end portions of the conductive wire 1 are directed to be disposed around along the opposing surfaces of two facing wall portions 41. Drawn out along the two wall portions 41, both of the end portions of the conductive wire 1 are then wound around the terminals 31 via notch portions 31a and 31b provided on the terminals 31, and fixed to the terminals 31 by caulking and electrically connected to the terminals 31. Both of the end portions of the conductive wire 1 may also be connected to the terminals 31 by welding or the like.

Further, in this preferred embodiment, the bobbin 2, the terminal portion 3 and the wall portions 41 are provided as an integrally molded article by filling resin into a mold and solidifying the molded resin; however, the bobbin 2, the terminal portion 3 and the wall portions 41 may be provided separately and assembled together by an adhesive or the like.

The solenoid of the electromagnetic valve according to this preferred embodiment includes the conductive wire 1, the bobbin 2 having the cylindrical winding portion 2a where the conductive wire 1 is wound around in the coil shape and the flange portion 2b which is disposed on both of the end portions of the winding portion 2a, the terminal portion 3 which is disposed on the flange portion 2b and protrudes in the planar shape in the direction perpendicular to the central axis of the bobbin 2 on the radially outer side than the winding portion 2a relative to the central axis, and in which two terminals 31 are provided on the distal end portion side, and the two wall portions 41 which are disposed on both sides of the terminal portion 3 in the width direction and face with each other while standing upright in the central axis direction. Both of the end portions of the conductive wire 1 are drawn out from the bobbin 2 to the terminal portion 3, directed toward the radially outer side from the winding portion 2a side of the two wall portions 41, and electrically connected to the terminals 31.

When the conductive wire 1 is drawn out from the bobbin 2 and connected to the terminals 31, the wall portions 41 serve as a guide to the conductive wire 1. For this reason, since both of the end portions of the conductive wire 1 are not intersected, the breaking of the wire that could be caused by the cross wiring may be prevented. As a result, it is possible to reduce excessive processes for preventing the breaking of the wire due to the cross wiring. With this, the breaking of the wire can be prevented by reducing the number of the processes in a simple structure.

Further, in the solenoid of the electromagnetic valve according to this preferred embodiment, both of the end portions of the conductive wire 1 may be molded with resin. In this case, since a gap between both of the end portions is not narrowed as opposed to the cross wiring, a resin pressure applied to both of the end portions of the conductive wire 1 when molding the resin is reduced as compared to the cross wiring, so that there is an advantage that the breaking of the wire resulting from the resin pressure and the wire floating from the terminal portion 3 may be suppressed.

The gap between two wall portions 41 is set to be narrower than the outer diameter of the winding portion 2a. Accordingly, the wiring is prevented from floating. That is, since the gap between the wall portions 41 is narrower than the outer diameter of the winding portion 2a, the conductive wire 1 can be wound to securely tie up the winding portion 2a, so that the conductive wire 1 can be prevented from floating from the bobbin 2 and the terminal portion 3. Accordingly, stress loads added to the conductive wire 1 by the floating of the wiring can be suppressed, whereby the breaking of the wire can be suppressed.

Both of the end portions of the conductive wire 1 are directed to be disposed along the opposing surfaces of two facing wall portions 41 and electrically connected to the terminals 31. With this, the floating of the wiring is suppressed. That is, since the conductive wire 1 is wired via inner sides of the wall portions 41, the conductive wire 1 can be wound to tie up the winding portion 2*a*, so that the conductive wire 1 can be prevented from floating from the bobbin 2 and the terminal portion 3. Accordingly, stress loads added to the conductive wire 1 by the floating of the wiring can be suppressed, whereby the breaking of the wire can be suppressed.

The wall portions 41 extend from the terminals 31 to the outer edge portions of the flange portion 2*b*. With this, both of the end portions of the conductive wire 1 drawn out from the bobbin 2 can be wired using the wall portions 41 as a guide, workability of the wiring can be improved.

The wall portions 41 are protrusions that stand upright with respect to the end surfaces of the terminal portion 3 in the central axis direction. With this, wiring can be smoothly performed in a simple structure.

Since the two notch portions 21 are provided on the outer edge portions of the flange portion 2*b* and on the outer sides of two wall portions 41, both of the end portions of the conductive wire 1 wound around the winding portion 2*a* are drawn out to the inner sides of two wall portions 41 via the respective notch portions 21, so that both of the end portions of the conductive wire 1 are electrically connected to the terminals 31 along two wall portions 41. With this, the conductive wire 1 can be properly positioned on the outer edge portions of the flange portion 2*b*, whereby the floating of the wiring can be suppressed.

The groove 22 reaching from the notch portion 21 to the winding portion 2*a*, which the winding start portion of the conductive wire 1 passes through, is provided on the inner surface of the flange portion 2*b*. With this, the conductive wire 1 is easily wound around the winding portion 2*a* while the conductive wire 1 can be properly positioned on the inner surface of the flange portion 2*b*, so that the floating of the wiring can be prevented.

Both of the end portions of the conductive wire 1 drawn out along two wall portions 41 are wound around the terminals 31 via the notch portions 31*a* and 31*b* provided on the terminals 31 and fixed to the terminals 31. With this, portions of the conductive wire 1 disposed along the wall portions 41 can be prevented from floating from the wall portions 41.

1-3. Modification Examples of First Exemplary Preferred Embodiment

Now, first to third modification examples of the first exemplary preferred embodiment will be described with reference to FIG. 4 to FIG. 6. The first to third modification examples relate to modifying the shape of the wall portions 41, and basic configurations are the same as the first exemplary preferred embodiment. Accordingly, in the following descriptions, only different parts from the first exemplary preferred embodiment will be explained, and detailed explanations related to the same part as the first exemplary preferred embodiment will be omitted, while the same reference numerals designate the same elements as in the first exemplary preferred embodiment.

First Modification Example

Figure 4:
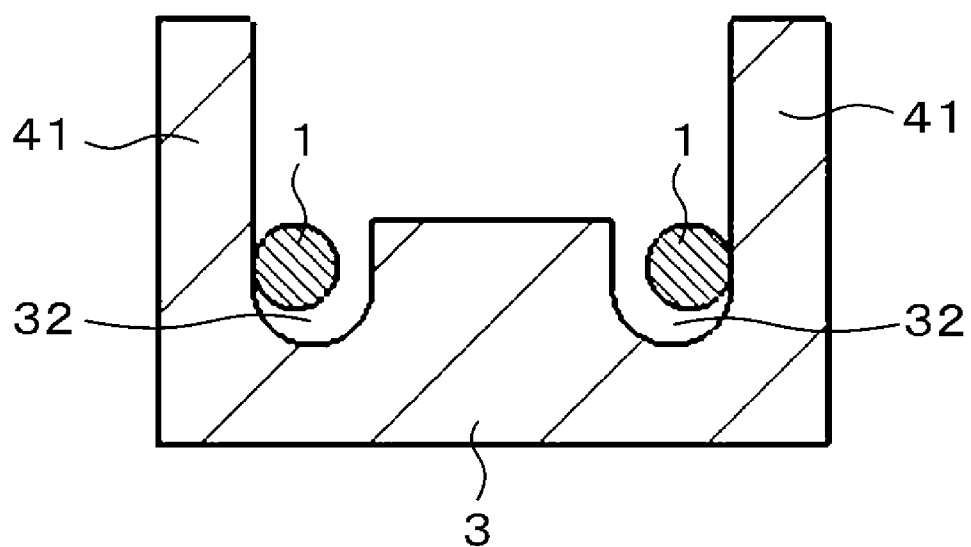
FIG. 4 is a cross-sectional view of a terminal portion in a width direction according to the first modification example of the first exemplary preferred embodiment of the present invention.

As shown in FIG. 4, grooves 32 are provided on the upper end surface of the terminal portion 3. The grooves 32 are provided along the wall portions 41 on proximal portions of the opposing surfaces of the two wall portions 41, and both of the end portions of the conductive wire 1 pass through the respective grooves 32. That is, the grooves 32 serve as a guide to direct the conductive wire 1, which is drawn out from the bobbin 2 to the terminal portion 3 side via the notch portion 21 of the flange portion 2*b*, to the terminals 31.

In other words, as the configuration of the wall portions 41, the wall portions 41 may include the grooves 32, and only grooves 32 are provided without protrusions on the upper end surface of the terminal portion 3.

Second Modification Example

Figure 5:
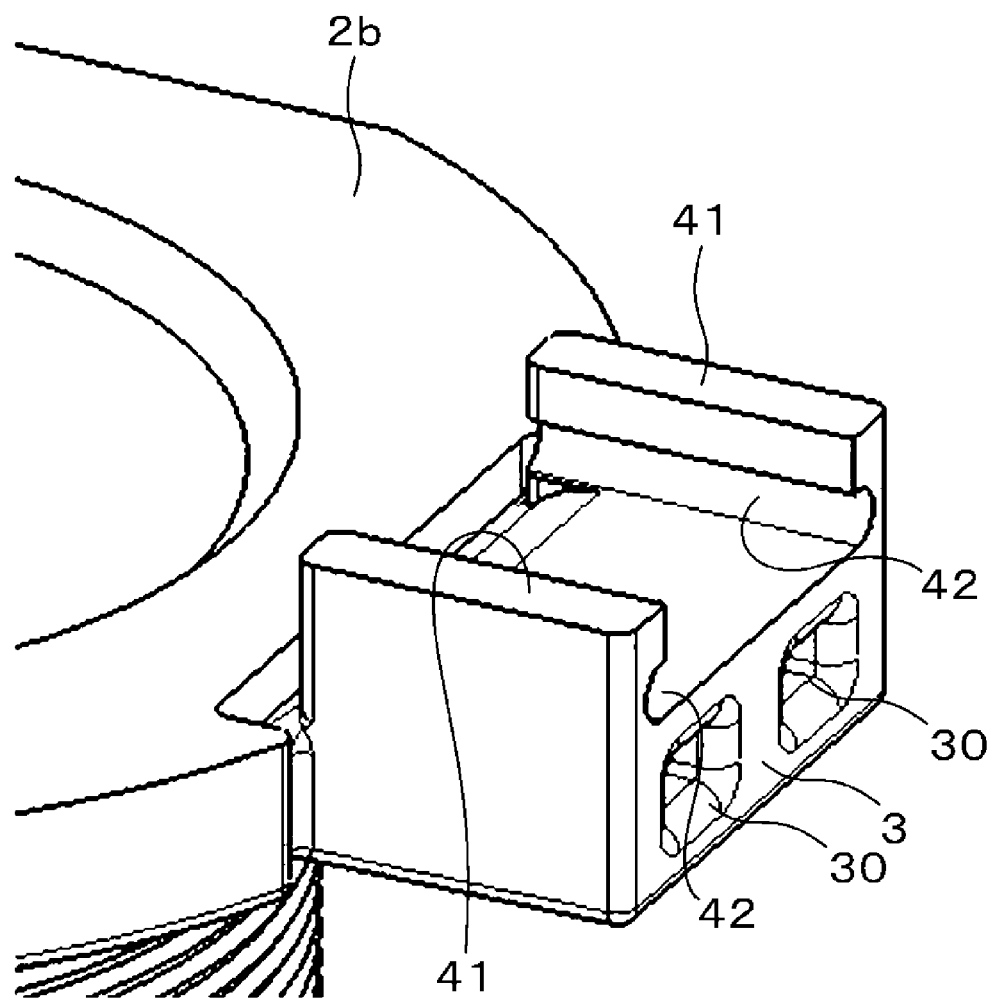
FIG. 5 is a perspective view of a solenoid of an electromagnetic valve according to the second modification example of the first exemplary preferred embodiment of the present invention.

As shown in FIG. 5, grooves 42 are provided on the inner surface of the wall portions 41, that is, on the opposing surfaces of two wall portions 41 which face each other. The grooves 42 are provided on proximal portions of the inner surfaces of the two wall portions 41, and both of the end portions of the conductive wire 1 pass through the grooves 42. That is, the grooves 42 serve as a guide to direct the conductive wire 1, which is drawn out from the bobbin 2 to the terminal portion 3 side via the notch portion 21 of the flange portion 2*b*, to the terminals 31.

Third Modification Example

Figure 6:
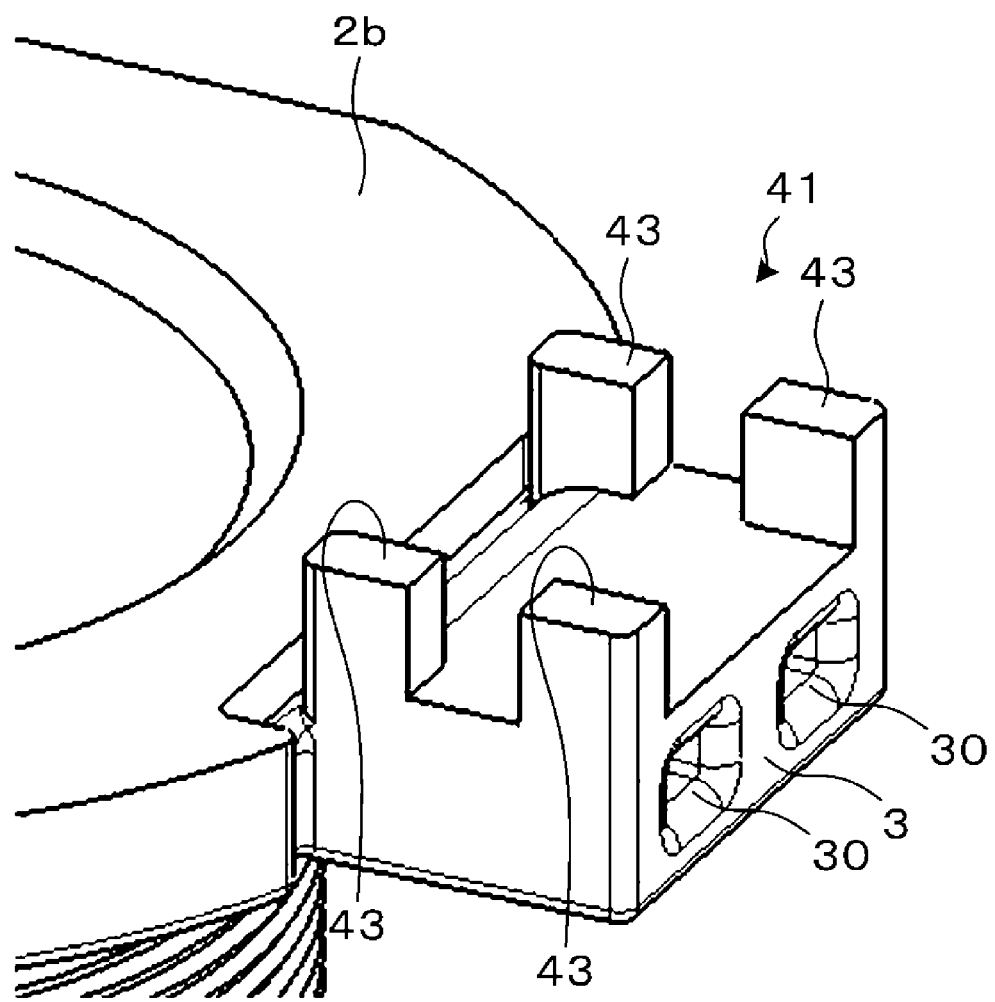
FIG. 6 is a perspective view of a solenoid of an electromagnetic valve according to the third modification example of the first exemplary preferred embodiment of the present invention.

As shown in FIG. 6, the wall portion 41 is formed of pins 43 disposed uprightly on the upper end surface of the terminal portion 3. Here, a plurality of pins 43 are disposed with a predetermined gap therebetween on both sides of the terminal portion 3 in the width direction along a direction from the terminals 31 to the outer edge portions of the flange portion 2*b*. The pins 43 serve as a guide to direct the conductive wire 1, which is drawn out from the bobbin 2 to the terminal portion 3 side via the notch portion 21 of the flange portion 2*b*, to the terminals 31. Further, the number of pins 43 may vary as required.

As described above, the configuration of the wall portions 41 may be modified to the first to third modification examples, and the same effects as the first exemplary preferred embodiment can also be obtained in the modifications without crossing both of the end portions of the conductive wire 1.

Second Exemplary Preferred Embodiment

The second exemplary preferred embodiment will now be described in reference to FIG. 7 and FIG. 8. Basic configurations of the second exemplary preferred embodiment are the same as the first exemplary preferred embodiment. Accordingly, in the following descriptions, only different parts from the first exemplary preferred embodiment will be explained, and detailed explanations related to the same part as the first exemplary preferred embodiment will be omitted, while the same reference numerals designate the same elements as in the first exemplary preferred embodiment.

Figure 7:
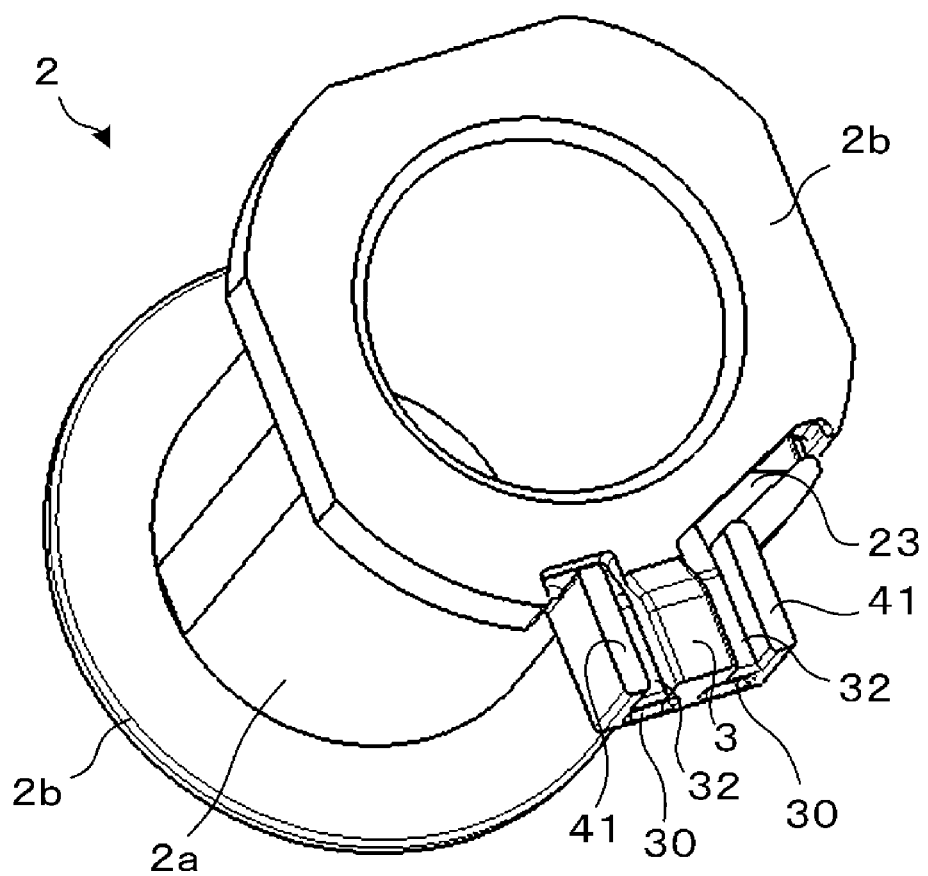
FIG. 7 is a perspective view of a bobbin according to the second exemplary preferred embodiment of the present invention.
Figure 8:
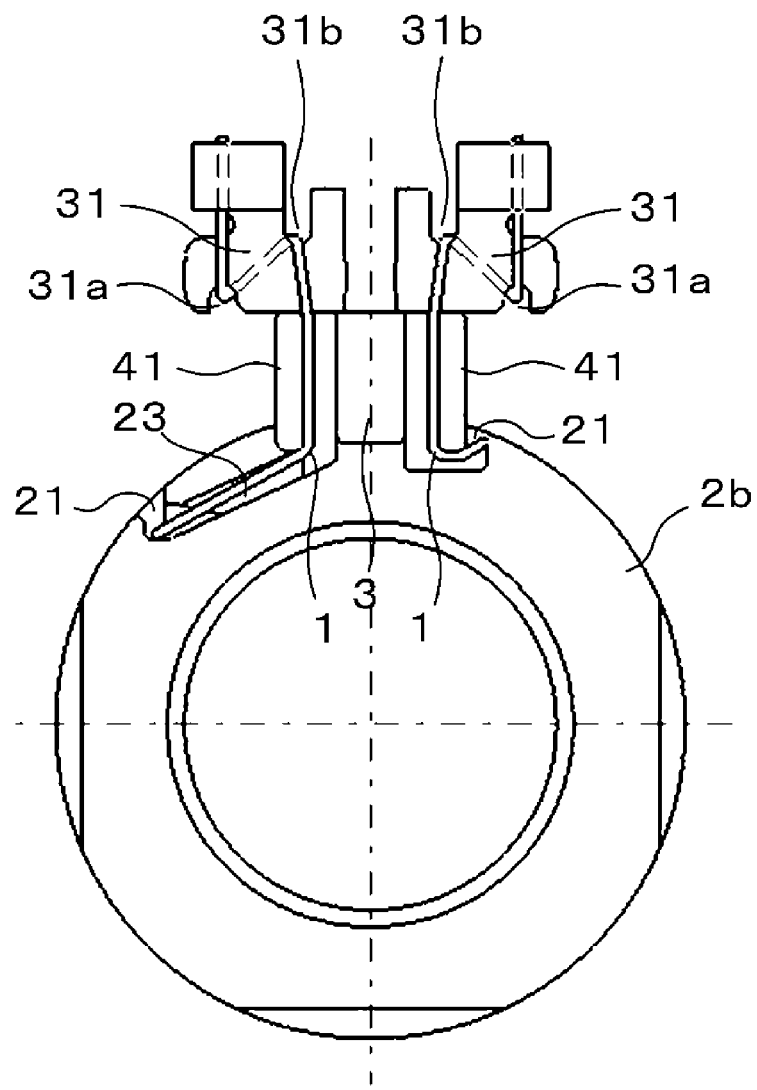
FIG. 8 is a top view of a solenoid of an electromagnetic valve according to the second exemplary preferred embodiment of the present invention.

As shown in FIG. 7 and FIG. 8, a groove 23 for guiding the winding start portion of the conductive wire 1, which is electrically connected to the terminals 31, from the outer surface side of the flange portion 2*b* to the winding portion 2*a* side, is provided on the outer surface of the flange portion 2*b*. The winding start portion of the conductive wire 1, which is electrically connected to the terminal 31 and drawn out along the wall portion 41, passes through the groove 23 and the notch portion 21 of the outer edge portion of the flange portion 2*b* and passes through the winding portion 2*a* side. Further, the grooves 32 are provided on the upper end surface of the terminal portion 3 in this preferred embodiment like the first modification example, and the winding start portion of the conductive wire 1 passes through the groove 23 via the grooves 32.

With this, by providing the groove 23, which passes the winding start portion of the conductive wire 1, onto the outer surface of the flange portion 2*b*, the conductive wire 1 can be easily wired from the outer side to the inner side of the bobbin 2, and easily wound around the winding portion 2*a*.

3. Other Exemplary Preferred Embodiment

The present disclosure is not limited to the preferred embodiments described above. Such preferred embodiments are explained as only examples, and may be practiced into various aspects. It should be appreciated that although some features may be omitted, substituted and modified in a various manner without departing the scope of the disclosure, these preferred embodiments, modifications and their equivalents are construed to be included in the essential spirit or the scope of the present disclosure.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A solenoid of an electromagnetic valve, comprising:
   a conductive wire;
   a bobbin having a tubular winding portion where the conductive wire is wound around in a coil shape, and a flange portion disposed on both end portions of the winding portion;
   a terminal portion which is disposed on the flange portion and protrudes in a planar shape in a direction perpendicular to a central axis of the bobbin on a radially outer side than the winding portion relative to the central axis, and in which two terminals are provided on a distal end portion side; and
   two wall portions which are disposed on both sides of the terminal portion in a width direction and stand upright in a central axis direction,
   wherein both end portions of the conductive wire are drawn out from the bobbin to the terminal portion, directed toward a radially outer side from a winding portion side of the two wall portions and electrically connected to the terminals.

2. The solenoid of the electromagnetic valve of claim 1, wherein a gap between two wall portions is narrower than an outer diameter of the winding portion.

3. The solenoid of the electromagnetic valve of claim 1, wherein both of the end portions of the conductive wire are directed to be disposed along opposing surfaces of the two wall portions facing each other and electrically connected to the terminals.

4. The solenoid of the electromagnetic valve of claim 1, wherein the wall portions extend from the terminals to outer edge portions of the flange portion.

5. The solenoid of the electromagnetic valve of claim 1, wherein the wall portions are protrusions which stand upright with respect to an end surface of the terminal portion in the central axis direction.

6. The solenoid of the electromagnetic valve of claim 1, wherein the wall portions are grooves which are disposed on an end surface of the terminal portion in the central axis direction and the conductive wire is disposed in.

7. The solenoid of the electromagnetic valve of claim 1, wherein two notch portions are provided on outer edge portions of the flange portion and on outer sides of two wall portions, and
   both of the end portions of the conductive wire wound around the winding portion are drawn out to inner sides of the two wall portions via the respective notch portions and electrically connected to the terminals along two wall portions.

8. The solenoid of the electromagnetic valve of claim 7, wherein a groove reaching from a notch portion that passes a winding start portion of the conductive wire to the winding portion is provided on an inner surface of the flange portion.

9. The solenoid of the electromagnetic valve of claim 1, wherein a groove that guides a winding start portion of the conductive wire electrically connected to the terminals to a winding portion side on an outer surface side of the flange portion is provided on an outer surface of the flange portion.

10. The solenoid of the electromagnetic valve of claim 1, wherein both of the end portions of the conductive wire drawn out along two wall portions are respectively wound around the terminals via notch portions provided on the terminals and fixed to the terminals.

* * * * *